United States Patent
Kokubu et al.

[11] Patent Number: 5,844,990
[45] Date of Patent: Dec. 1, 1998

[54] TRANSMISSION-RECEPTION SYSTEM

[75] Inventors: Sadao Kokubu; Hisashi Aoki; Takashi Mizuno; Shinichi Koga, all of Niwa, Japan

[73] Assignee: Tokai-Rika-Denki-Seisakusho Kabushiki Kaisha, Niwa, Japan

[21] Appl. No.: 749,786

[22] Filed: Nov. 15, 1996

[30] Foreign Application Priority Data

Nov. 16, 1995 [JP] Japan ................................. 7-298087
Nov. 21, 1995 [JP] Japan ................................. 7-302611

[51] Int. Cl.$^6$ ..................................................... H04K 1/00
[52] U.S. Cl. ................................................. 380/23; 380/49
[58] Field of Search ................................. 380/23, 25, 49

[56] References Cited

U.S. PATENT DOCUMENTS 5,055,701  10/1991  Takeuchi .
5,420,925   5/1995  Michaels .................................. 380/23
5,506,905   4/1996  Markowski et al. ................. 380/25

Primary Examiner—David Cain
Attorney, Agent, or Firm—Oliff & Berridge, PLC

[57] ABSTRACT

The invention relates to a transmission-reception system, particularly a transmitter-receiver device contained in the bow of an ignition key. When a resonance circuit receives a carrier wave signal from a transmission-reception ECU of a motor vehicle, a microcomputer is switched to an active state by the output of a power circuit that smoothes and rectifies the carrier wave signal. A detector circuit discriminates an enquiry signal supplied together with the carrier wave signal through the resonance circuit portion, and outputs the signal to the microcomputer. In response to the enquiry signal together with random number data, the activated microcomputer changes the bit length of an identification code stored in an EEPROM, on the basis of the received random number data and a predetermined function, and performs the on-off control of an FET of a modulating circuit in a mode corresponding to the bit length-changed identification code. The microcomputer thus performs control to send back an enciphered answer signal to the transmission-reception ECU.

9 Claims, 6 Drawing Sheets

TRANSMISSION-RECEPTION SYSTEM

BACKGROUND OF THE INVENTION

1. Field of the Invention

The present invention relates to a transmitter-receiver system, including a device having a transponder function of sending back an answer signal upon receiving an enquiry signal and a power signal. In the transmission-reception system of the invention, an interrogator and a responder exchange enquiry signals and answer signals in response thereto and, more particularly, the responder varies or scrambles the answer signal to be transmitted therefrom.

2. Description of the Related Art

Many motor-vehicle ignition keys are equipped with an electronic key function using an electric identification code, in order to enhance security against theft. Normally, such an ignition key is provided with a transmitter-receiver device contained in the key bow, and the transmitter-receiver device receives a power signal and an enquiry signal from an outside source, and sends back an answer signal that includes a pre-stored identification code.

For this electronic key function, the motor vehicle is equipped with a transmission-reception ECU that serves as an interrogator. The transmission-reception ECU, when an ignition key as described above is inserted in the ignition keyway and turned to the ON or ACC position, transmits the power signal and the enquiry signal to the ignition key, and receives the answer signal from the transmitter-receiver device of the ignition key, and then permitting the engine to start by the ignition key only when the identification code included in the answer signal agrees with a predetermined identification code.

The transponder function of the conventional transmitter-receiver devices is normally implemented by hard logic, resulting in fixed identification codes. Since fixed identification codes are relatively easy to copy, the conventional art is unable to sufficiently safeguard privacy or protect against theft.

The enciphering of identification codes is one measure to address this security problem. However, since it is difficult to employ a complicated cipher in conventional transmitter-receiver devices, the encipherment of the identification codes is not expected to significantly improve the privacy function. Furthermore, the employment of a cryptosystem will complicate the hardware construction, increasing costs. In addition, once the aforementioned transmitter-receiver device is contained in a key bow, it is difficult to change the hardware construction, that is, the enciphering method and the code format are unchangeable, resulting in a singularly fixed cryptographic procedure. Therefore, if different ciphers are to be employed for different car makers or different destination markets, it becomes necessary to prepare different hardware constructions for individual transmitter-receiver devices, thus degrading working efficiency in production.

For example, Japanese patent application laying-open No. HEI-7-18428 proposes a so-called rolling code method that sequentially changes the identification code for each answer signal transmission from the transmitter-receiver device. However, this method cyclically produces answer signals that have the same identification code, and the number of identification codes that can be set in is limited. If anyone deciphers and copies the identification codes, that person will very likely be able to start the engine using the deciphered identification codes. This method thus fails to sufficiently enhance the security against motor vehicle theft.

SUMMARY OF THE INVENTION

The present invention is intended to solve the above-stated and other problems in the art. It is an object of the invention to provide a transmitter-receiver device that improves key-signed privacy without complicating hardware construction or increasing production costs, and that is flexible to changes in the transmission signal enciphering method or the cipher code format.

It is another object of the invention to provide a transmission-reception system that improves privacy by a simple construction.

According to a first aspect of the invention, there is provided a transmitter-receiver device having a transponder capability of, upon receiving a power signal and an enquiry signal from an outside source, responding to the enquiry signal by sending back an answer signal including a pre-stored identification code, comprising: a resonance circuit portion formed of a transponder coil and a resonance capacitor; a power circuit for rectifying and smoothing a power signal supplied through the resonance circuit from an external antenna coil when the antenna coil is electromagnetically coupled with the resonance circuit; a microcomputer operated by output from the power circuit; a detector circuit whose time constant is lower than the time constant of the smoothing function portion of the power circuit, and which, when the resonance circuit portion is electromagnetically coupled with an external antenna coil, discriminates enquiry signal supplied together with the power signal through the resonance circuit portion from the external antenna coil, and outputs the enquiry signal to the microcomputer; storing means in which a specific identification code is stored; and a modulating circuit that operates to transmit the answer signal by changing an impedance of the resonance circuit portion. The microcomputer is constructed so that, upon receiving an enquiry signal through the detector circuit, the microcomputer generates a cipher code by calculation using the identification code read from the storing means, and performs control of transmission of an answer signal through the resonance circuit portion by operating the modulating circuit in a mode corresponding to the cipher code.

Since this construction transmits an enciphered answer signal in response to an enquiry signal, the privacy safeguards will be improved. Furthermore, since the encipherment of answer signals is based on the operations of the microcomputer, the transmitter-receiver device of the invention is able to perform encipherment as desired without requiring complicated hardware construction while achieving a significant improvement in security. In addition, since the enciphering method or the like can be changed simply by changing the storage content of the microcomputer, the construction allows various cryptographic procedures to be used, eliminating the need to prepare different hardware constructions for individual transmitter-receiver devices. As a result, the working efficiency in production can be improved and costs can be reduced.

It is preferred to use a data-reloadable nonvolatile memory as the storing means so that the identification code can be changed. This preferred construction facilitates the setting and changing of the identification code format, improving the privacy function and increasing the degrees of freedom in design. In addition, the storing means becomes able to be used as a storage for other useful data. Thus the transmitter-receiver device becomes more convenient to use.

It should be noted that, in this specification and the claims, terms such as "cipher", "encipher" and related terms generally but not limitingly refer to operations of varying coding techniques, including the changing of the bit length of codes.

According to a second aspect of the invention, there is provided a transmission-reception system comprising: an interrogator that transmits an enquiry signal; and a responder that, upon receiving an enquiry signal from the interrogator, responds to the enquiry signal by sending back to the interrogator an answer signal including a pre-stored identification code. The interrogator transmits random number data together with the enquiry signal, and determines whether an answer signal from the responder is proper by calculation based on the random number data and the identification code stored in the interrogator. The responder changes the bit length of the stored identification code on the basis of the random number data from the interrogator and a predetermined calculation, and sends back an answer signal including the thus-changed identification code.

In this system construction, upon receiving an enquiry signal transmitted together with random number data from the interrogator, the responder changes the bit length of the pre-stored identification code on the basis of the random number data received from the interrogator and the predetermined calculation, and sends back an answer signal including the thus-changed identification code. Upon receiving the answer signal, the interrogator determines whether the answer signal is proper by the calculation based on the random number data transmitted to the responder and the identification code stored in the interrogator.

Since the interrogator's determination on the properness of an answer signal is based on both the bit length of the identification code included in the answer signal and the content of the identification code, the system of the invention considerably improves security with regard to the answer signals from the responder, compared with the conventional method in which a plurality of identification codes sequentially cycle.

It is preferred that the responder be constructed to encipher the stored identification code by a predetermined cryptosystem, change the bit length of the enciphered identification code on the basis of the random number data received from the interrogator and the predetermined calculation, and send back an answer signal including the thus-changed identification code. Since this preferred construction performs double-encipherment of the identification, security with regard to the answer signals from the responder is remarkably improved.

It is also preferred that the responder be constructed to change the bit length of the identification code on the basis of the random number data received from the interrogator and the predetermined calculation, and then encipher the thus-changed identification code by a predetermined cryptosystem, and send back an answer signal including the enciphered identification code. Since this preferred construction also performs double-encipherment of the identification, the privacy ability with regard to the answer signals from the responder is remarkably improved.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF PREFERRED EMBODIMENTS

Preferred embodiments of the present invention will be described hereinafter with reference to the accompanying drawings.

A first embodiment in which the present invention is applied to a motor-vehicle load control system will be described with reference to FIGS. 1–3.

Figure 1:
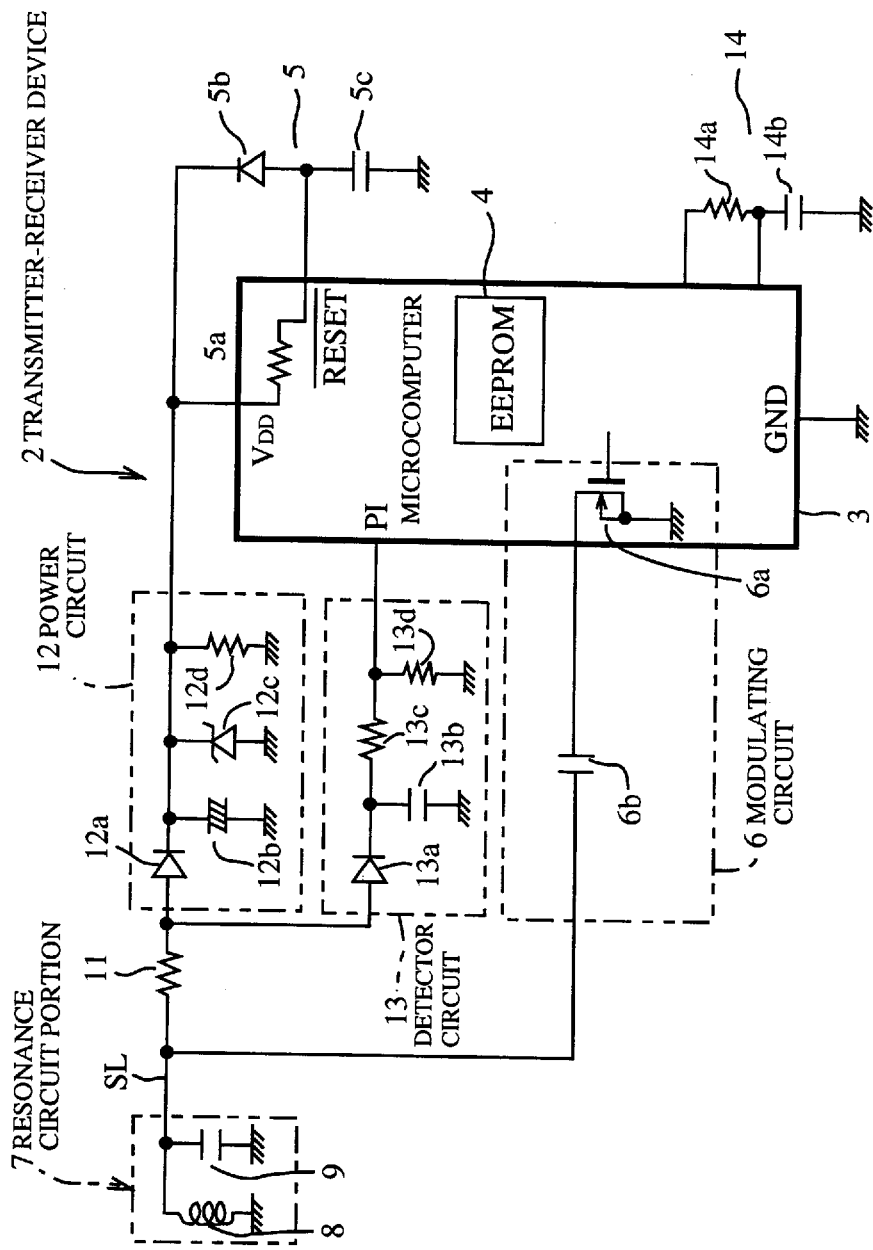
FIG. 1 illustrates an electrical construction of a transmitter-receiver device according to a first embodiment of the present invention.
Figure 2:
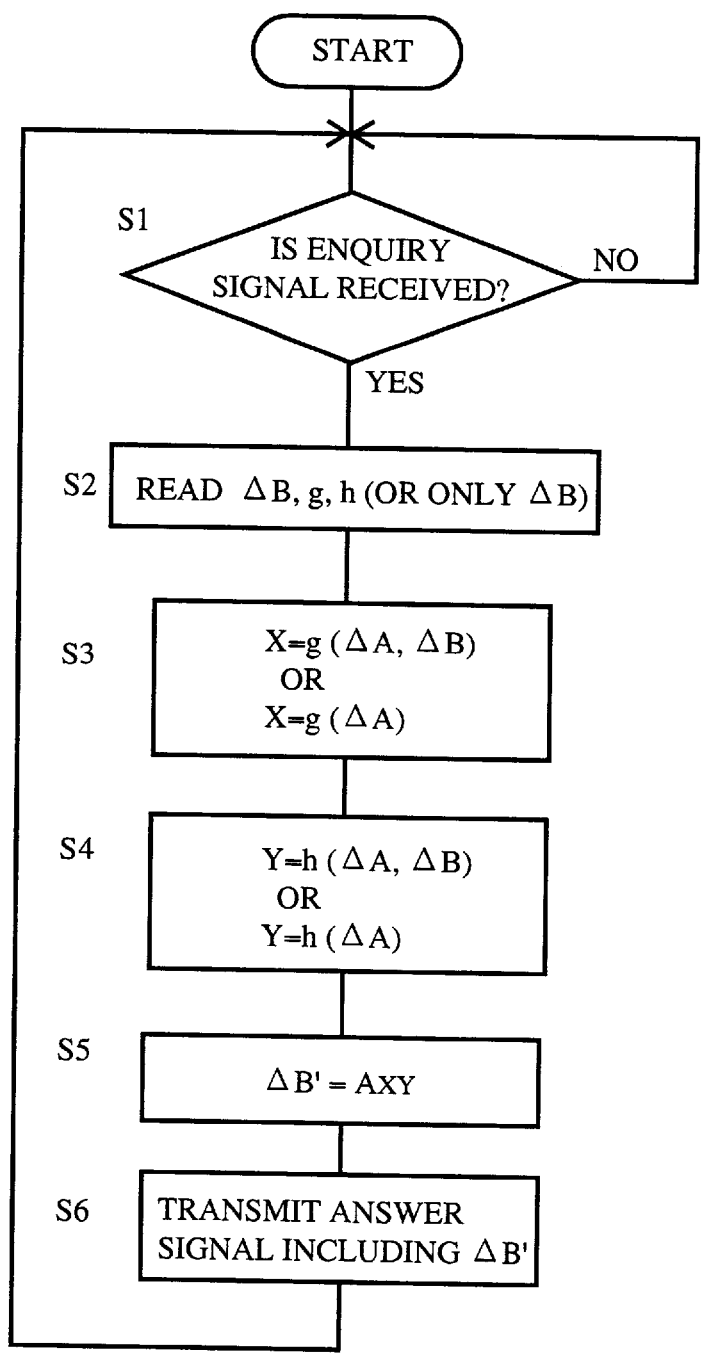
FIG. 2 is a flowchart illustrating the control performed by the transmitter-receiver device.
Figure 3:
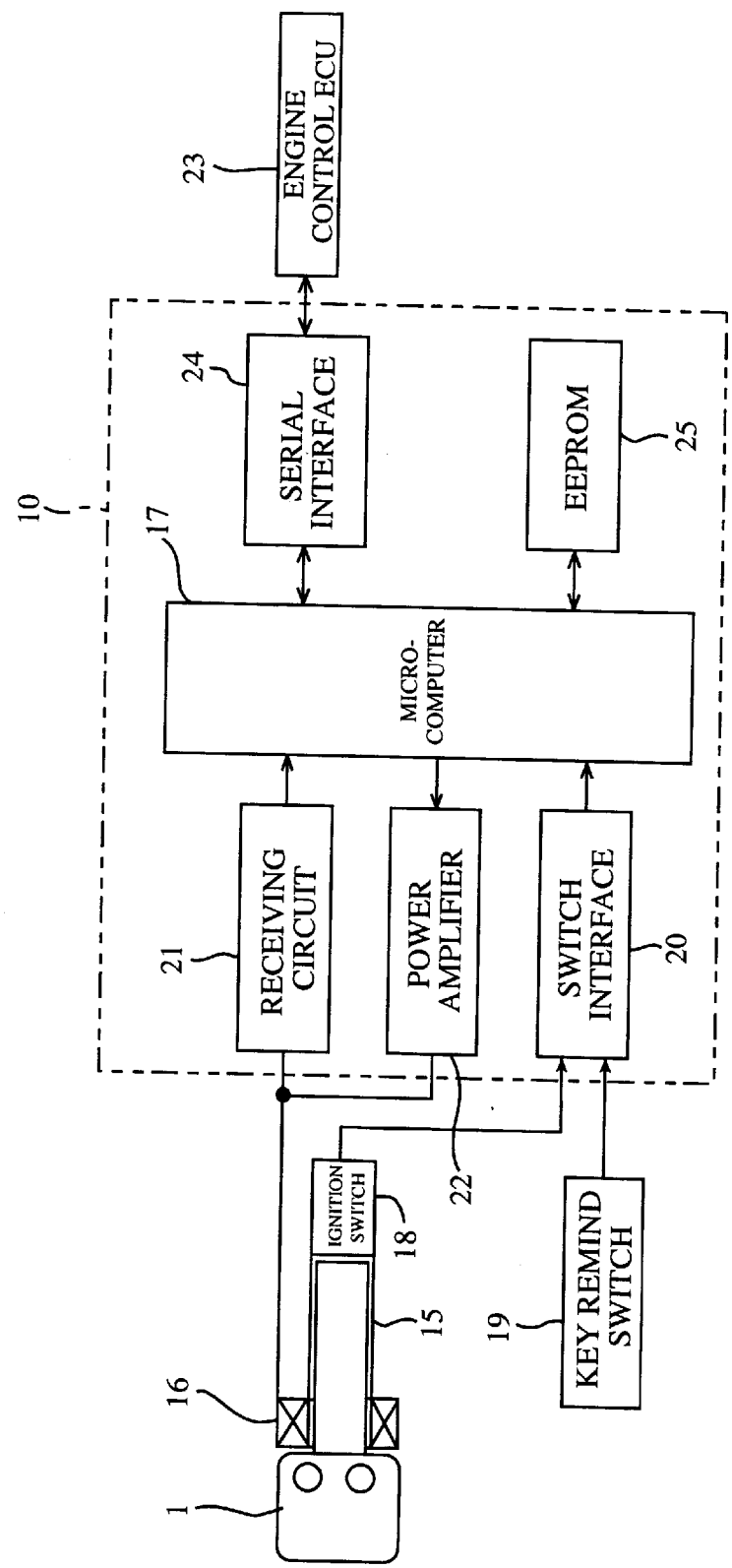
FIG. 3 is a functional block diagram showing the overall system construction.

FIG. 1 illustrates an electrical construction of a transmitter-receiver device 2 (corresponding to a responder according to the invention) contained in the bow of an ignition key 1 shown in FIG. 3.

Referring to FIG. 1, the transmitter-receiver device 2 has a microcomputer 3 as a significant component. Upon receiving a power signal and an enquiry signal from an outside source, transmitter-receiver device 2 responds to the enquiry signal by sending back an answer signal described below. The detailed construction of the apparatus will be described below.

The microcomputer 3 contains an EEPROM 4, a resistor 5a of a power-on reset circuit 5 later described, and an n-channel FET 6a of a modulating circuit 6 later described. The EEPROM 4 stores an identification code ΔB specific to the corresponding ignition key 1, and also stores later-described functions for generating a cipher code or varying the bit length of the identification code ΔB, and optionally a calculating code.

The aforementioned functions may be written in a program ROM provided in the microcomputer 3. The bit length of the identification code ΔB is preset to a suitable value within a range of, merely for example, 40 to 48 bits.

A resonance circuit portion 7 comprises a transponder coil 8 and a resonance capacitor 9 that are connected in parallel between a signal line SL and a ground terminal. The resonance frequency is preset to conform to the frequency band of the carrier wave signal (or power signal) transmitted from a transmission-reception ECU 10 (shown in FIG. 3) installed in the motor vehicle.

A power circuit 12, connected to the signal line SL by a resistor 11, rectifies and smoothes the carrier wave signal received by the resonance circuit portion 7 and sends the thus-obtained output to a power terminal VDD of the microcomputer 3. The power circuit 12 comprises a rectifying diode 12a, a smoothing capacitor 12b, a constant-voltage diode 12c and a resistor 12d that are connected as shown in FIG. 1.

A detector circuit 13, connected to the signal line SL by the resistor 11, discriminates the enquiry signal supplied together with the carrier wave signal through the resonance circuit portion 7, and sends the discriminated signal to an input port PI of the microcomputer 3. The detector circuit 13 comprises a detector diode 13a, a capacitor 13b, and resistors 13c, 13d that are connected as shown in FIG. 1.

The time constant of the detector circuit 13 is preset to a value lower than the charging time constant of the smoothing function portion of the power circuit 12, thus enabling the discrimination of enquiry signals.

The modulating circuit 6, comprising the FET 6a, is connected in parallel to the resonance capacitor 9. In the modulating circuit 6, a modulating capacitor 6b and the source and drain of the FET 6a are connected in series. The impedance of the resonance circuit portion 7 can be changed by turning FET 6a on and off.

The reset circuit 5 performs the power-on reset function of holding the microcomputer 3 in a reset state until the level of power supplied to the power terminal VDD of the microcomputer 3 (the output voltage level of the power circuit 12) reaches a predetermined level. The reset circuit 5 comprises a diode 5b, a capacitor 5c and the resistor 5a connected as shown in FIG. 1. An oscillating circuit 14 comprises a resistor 14a and a capacitor 14b, and determines the clock frequency of the microcomputer 3.

The functions of the transmitter-receiver device 2 will be described in conjunction with the control by the microcomputer 3.

When the resonance circuit portion 7 receives a carrier wave signal (power signal as described below) and an enquiry signal including a predetermined random number data ΔA from the transmission-reception ECU 10, the power circuit 12 rectifies and smoothes the carrier wave signal and outputs the signal to the power terminal VDD of the microcomputer 3. When the output power reaches a predetermined level, the reset state held by the reset circuit 5 is canceled, and the microcomputer 3 is switched to an active state. In addition, the detector circuit 13 discriminates the enquiry signal received and then outputs it to the input port PI of the microcomputer 3.

The thus-activated microcomputer 3, upon receiving the enquiry signal supplied through the detector circuit 13, reads the identification code ΔB from the EEPROM 4, enciphers identification code ΔB, and further operates the modulating circuit 6 to send back an enciphered answer signal including the thus-changed identification code ΔB.

The microcomputer 3 is designed to perform the encipherment of answer signals in, for example, the following manner. Upon receiving an enquiry signal, the microcomputer 3 reads a function F, the identification code ΔB and, optionally, the calculating code ΔC from the EEPROM 4, and carries out the function calculation using the random number code ΔA included in the enquiry signal, the identification code ΔB and the calculating code ΔC as variables, that is, the calculation of F(ΔA, ΔB, ΔC). The calculation result is output as a cipher code.

According to this embodiment, the identification code ΔB is subjected to a bit length change as one form of encipherment. The control of the transponder function will be described below with reference to the flowchart shown in FIG. 2.

If the microcomputer 3 receives an enquiry signal including the random number data ΔA (affirmative determination in step S1), the microcomputer 3 reads the identification code ΔB and functions g, h from the EEPROM 4 (step S2), and then performs calculations to change the bit length of the identification code ΔB on the basis of the functions g, h and the received random number data ΔA in the following steps S3–S5, determining an identification code ΔB' However, in a construction where the functions g, h are stored in the program ROM, the retrieving of the functions g, h is unnecessary.

The function g determines which bit of the identification code ΔB before the bit length change (hereinafter, referred to as "Xth bit ") corresponds to the first bit (LSB) of the identification code ΔB' after the change. Step S3 performs function calculation using both the random number data ΔA and the identification code ΔB as variables, or function calculation using only the random number data ΔA as a variable, that is:

$X=g(\Delta A, \Delta B)$ or $X=g(\Delta A)$

The function h determines which bit of the identification code ΔB before the bit length change (hereinafter, referred to as "Yth bit") corresponds to the end bit (MSB) of the identification code ΔB' after the change. Step S4 performs function calculation using both the random number data ΔA and the identification code ΔB as variables, or function calculation using only the random number data ΔA as a variable, that is:

$Y=h(\Delta A, \Delta B)$ or $Y=h(\Delta A)$

Based on the thus-calculated values of X, Y, step S5 extracts a code AXY starting at the Xth bit and ending at the Yth bit of the identification code ΔB, and determines the code AXY as a bit length-changed identification code ΔB'.

After obtaining the bit length-changed identification code ΔB', the microcomputer 3 transmits an answer signal including the identification code ΔB' (step S6) to ECU 10, and returns to the determining step S1.

More specifically, step S6 performs on-off control of FET 6a of the modulating circuit 6 in a mode corresponding to the bit length-changed identification code ΔB', to change the impedance of the resonance circuit portion 7. Thus the received carrier wave signal is modulated in amplitude in a mode corresponding to the bit length-changed identification code ΔB'. The change of the impedance of the resonance circuit portion 7 achieved by the modulating circuit 6 is detected by the transmission-reception ECU 10. In this manner, the enciphered answer signal (including the bit length-changed identification code ΔB') is sent back to the transmission-reception ECU 10.

FIG. 3 schematically illustrates the overall construction of the system by a combination of the functional blocks. An antenna coil 16 is provided around an ignition cylinder 15 of the motor vehicle. When the ignition key 1 is insert in the cylinder 15, the antenna coil 16 is electromagnetically coupled with the transponder coil 8 (see FIG. 1) contained in the ignition key 1.

The transmission-reception ECU 10, corresponding to an interrogator according to the invention, of the motor vehicle comprises a microcomputer 17 as a main component. The microcomputer 17 receives on-signals from a key remind switch 19 and an ignition switch 18 provided for the cylinder 15 as well known in the art, via a switch interface 20. The signal received by the antenna coil 16 is inputted to the microcomputer 17 through a receiving circuit 21.

The microcomputer 17 is constructed to control the transmission through the antenna coil 16 by the output from a power amplifier 22. This control will be described below. The microcomputer 17 sends signals to and receives signals from an engine control ECU 23 through a serial interface 24. The microcomputer 17 selectively inhibits the engine control ECU 23 from performing an engine starting operation.

In addition, the microcomputer 17 outputs data to and reads data from an EEPROM 25. The EEPROM 25 serially stores and updates the random number data generated every time a new enquiry signal is to be transmitted to the transmitter-receiver device 2. In addition, pre-stored in the EPROM 25 are the same identification code ΔB and functions as the identification code ΔB and functions stored in the EEPROM 4 of the ignition key 1 provided corresponding to the motor vehicle. Optionally, the EEPROM 25 stores the same calculating code ΔC as stored by the EEPROM 4. The functions may be written in the program ROM provided in the microcomputer 17.

The control by the microcomputer 17 of the transmission-reception ECU 10 will be described in conjunction with the functions of related components.

When the microcomputer 17 receives on-signals from the key remind switch 19 and the ignition switch 18, that is, when the ignition key 1 is inserted into the cylinder 15 and turned to the on-position (in this state, the antenna coil 16 and the transponder coil 8 of the ignition key 1 are electromagnetically coupled), the microcomputer 17 generates a new random number code ΔA by a predetermined calculation for producing random numbers, and stores the random number code ΔA into the EEPROM 25, or an internal memory (not shown). The microcomputer 17 also generates a pulse-train enquiry signal including the random number code ΔA, and operates the power amplifier 22 to transmit from the antenna coil 16 a predetermined-frequency carrier wave signal and an enquiry signal convoluted therewith including the random number code ΔA.

The carrier wave signal and the enquiry signal are thus transmitted from the antenna coil 16 to the transmitter-receiver device 2 (see FIG. 1) of the ignition key 1. In response to the carrier wave signal, the microcomputer 3 of the transmitter-receiver device 2 becomes able to be switched to the active state. The microcomputer 3 then determines a cipher code or a bit length-changed identification code ΔB' by the function calculation using the random number code ΔA included in the enquiry signal, and the identification code ΔB and the functions and, optionally, the calculating code stored in the EEPROM 4, and sends back an answer signal including the cipher code or the bit length-changed identification code ΔB', thus performing the transponder function.

The microcomputer 17 performs a decoding operation, more specifically, determines an identification code ΔB' by the calculation (corresponding to the operations in step S3–S5 in FIG. 2) using the random number code ΔA, the identification code ΔB and the functions g, h read from the EEPROM 25, and compares the identification code ΔB' with the identification code ΔB' included in the answer signal from the transmitter-receiver device 2. If the two identification codes do not agree, that is, if the received answer signal is not proper, the microcomputer 17 inhibits the engine control ECU 23 from starting the engine of the motor vehicle. In a construction where the functions g, h are stored in the program ROM, the retrieving of the functions g, h is unnecessary.

Therefore, if the ignition switch 18 is turned on by an incorrect ignition key 1 having a disagreeing identification code, the motor vehicle engine cannot be started. Security against theft is thus enhanced.

If the decoding operation finds that the identification code ΔB' determined by calculation agrees with the identification code ΔB' included in the answer signal from the transmitter-receiver device 2, that is, if the received answer signal is proper, the microcomputer 17 permits the engine control ECU 23 to start the motor vehicle engine.

In short, the starting of the motor vehicle engine by the engine control ECU 23 is allowed if the ignition cylinder 15 receives the correct ignition key 1 so that the bit length-changed identification codes ΔB' generated based on the identification codes ΔB and other parameters agree with each other. The embodiment thus performs an immobilization function.

As understood from the above description, this embodiment achieves the following advantages.

Since the transmitter-receiver device 2 is constructed so as to send back an enciphered answer signal in response to an enquiry signal from the transmission-reception ECU 10, the embodiment improves security and, therefore, the detection against theft of the motor vehicle. Since the transmitter-receiver device 2 changes the bit length of the pre-stored identification code ΔB on the basis of the random data ΔA included in the enquiry signal and the functions g, h, and sends back an enciphered answer signal including the thus-changed identification code ΔB', this embodiment achieves the encipherment of answer signals without complicating the construction.

In addition, since the transmission-reception ECU 10 determines the properness of a received enquiry signal on the basis of both the bit length and the content of the bit length-changed identification code ΔB' included in the enquiry signal in effect, this embodiment enhances security with regard to the answer signal from the transmitter-receiver device 2, compared with the conventional method in which a plurality of identification codes sequentially cycle.

Furthermore, since the enciphering method of transmission-receiver device 2 can be changed simply by changing the software or the storage contents of the microcomputer 3, the embodiment enables the setting of various cryptographic procedures, eliminating the need to prepare different hardware constructions for different transmitter-receiver devices 2. As a result, the working efficiency in production can be improved and production costs can be reduced. In addition, since the transponder function is controlled by the program installed in the microcomputer 3, the protocol of the communications between the transmitter-receiver device 2 and transmission-reception ECU 10 will not be fixed to a single protocol. Thus the embodiment increases the degrees of freedom in design.

Figure 4:
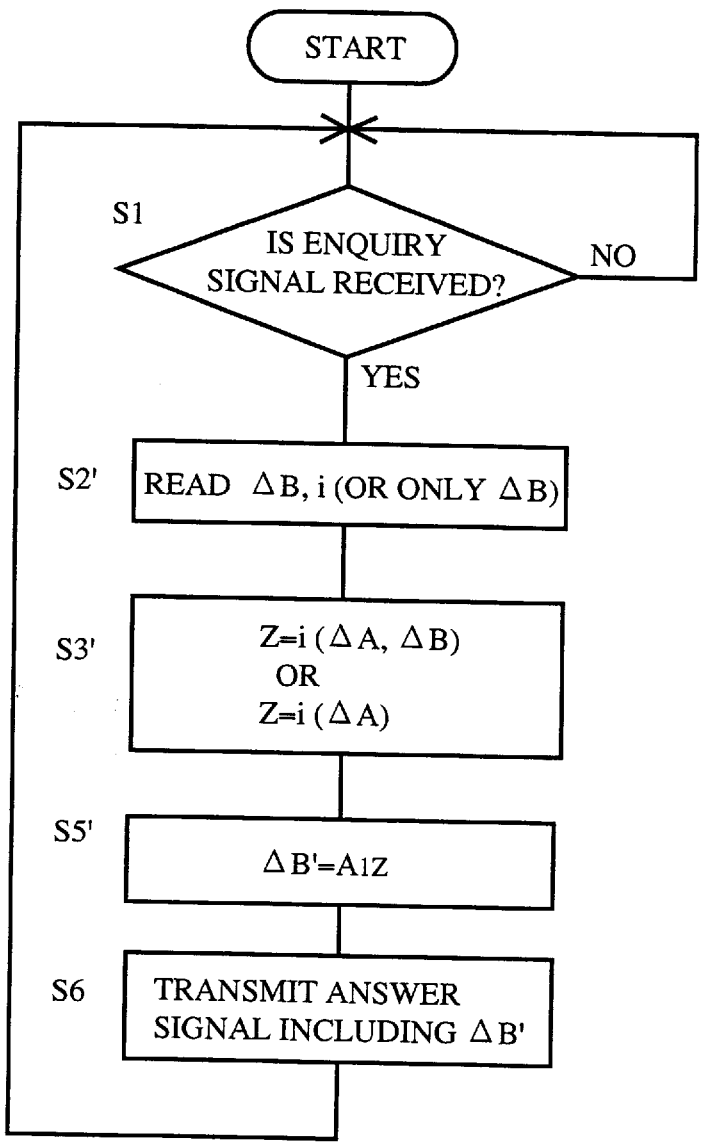
FIG. 4 is a flowchart illustrating the control operation according to a second embodiment of the present invention, corresponding to FIG. 2.

FIG. 4 illustrates a second embodiment of the invention that achieves advantages similar to those of the first embodiments. Only the features of the second embodiment that distinguishes it from the first embodiment will be described below.

The second embodiment differs from the first embodiment in the bit length changing control of identification code ΔB by the microcomputer 3 of the transmitter-receiver device 2. The flowchart of Fig.4 illustrates the control.

Referring to FIG. 4, when the microcomputer 3 receives an enquiry signal including random number data ΔA (affirmative determination in step S1), the microcomputer 3 reads the identification code ΔB and the function i from the EEPROM 4 (step S2'), and then performs calculations to change the bit length of the identification code ΔB on the basis of the function i and the received random number data ΔA in the following steps S3'–S5', determining an identification code ΔB'.

The function i determines the bit length Z of the identification code ΔB' after the bit length change. Step S3' performs function calculation using both the random number data ΔA and the identification code ΔB as variables, or function calculation using only the random number data ΔA as a variable, that is:

$$Z=i(\Delta A, \Delta B)$$

or $$Z=i(\Delta A)$$

Based on the thus-calculated value of the bit length Z, step S5' extracts a code A1Z starting at the first bit (LSB) and ending at the Zth bit of the identification code ΔB, and determines the code A1Z as an identification code ΔB' after the bit length change. Alternatively, the identification code ΔB' may be determined by extracting a code over the MSB and the less significant bits down to the Zth bit in the descending order.

After obtaining the identification code ΔB', the microcomputer 3 transmits an answer signal including the identification code ΔB' (step S6), and returns to the determining step S1.

Figure 5:
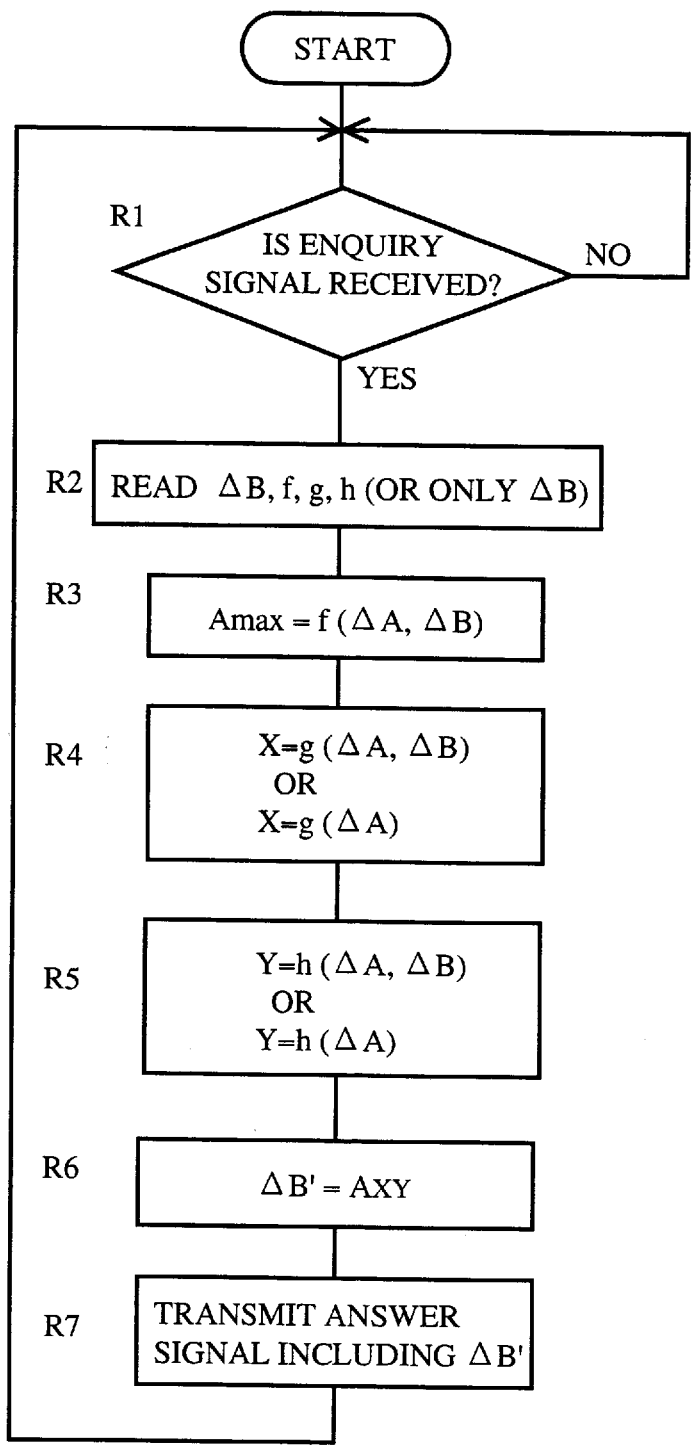
FIG. 5 is a flowchart illustrating the control operation according to a third embodiment of the present invention.

FIG. 5 illustrates a third embodiment of the invention that is modified from the first embodiment. The features of the third embodiment distinguishing it from the first embodiment will be described below.

The third embodiment is characterized by enciphering the identification code ΔB by a predetermined cryptosystem, prior to the bit length changing control of the identification code ΔB by the microcomputer 3 of the transmitter-receiver device 2. The enciphered identification code is then subjected to the bit length changing control. The flowchart of FIG. 5 illustrates this control operation.

Referring to FIG. 5, when the microcomputer 3 receives an enquiry signal including random number data ΔA (affirmative determination in step R1), the microcomputer 3 reads the identification code ΔB and the functions, f, g, h from the EEPROM 4 (step R2), and then performs calculations in the following steps R3–R5 to change the bit length of the identification code ΔB on the basis of the functions f, g, h and the received random number data ΔA, determining an identification code ΔB'.

The function f is a function for enciphering the identification code ΔB. For example, the conventional rolling or cyclical code enciphering method may be employed as a function f. According to this embodiment, step R3 performs the calculation of a function based on both the random number data ΔA and the identification code ΔB as variables, to encipher the identification code ΔB into a cipher code Amax of a predetermined bit length (for example, 40–48 bits), that is:

$$Amax=f(\Delta A, \Delta B)$$

The function g determines which bit of the cipher code Amax (the Xth bit) corresponds to the initial bit (LSB) of the identification code ΔB' after the bit length change. Step R4 performs function calculation using both the random number data ΔA and the identification code ΔB as variables, or function calculation using only the random number data ΔA as a variable, that is:

$$X=g(\Delta A, \Delta B)$$

or $$X=g(\Delta A)$$

The function h determines which bit of the cipher code Amax ( "the Yth bit") corresponds to the end bit (MSB) of the identification code ΔB' after the bit length change. Step R5 performs function calculation using both the random number data ΔA and the identification code ΔB as variables, or function calculation using only the random number data ΔA as a variable, that is:

$$Y=h(\Delta A, \Delta B)$$

or $$Y=h(\Delta A)$$

Based on the thus-calculated values of X, Y, step R6 extracts a code AXY starting at the Xth bit and ending at the Yth bit of the cipher code Amax, and determines the code AXY as an identification code ΔB' after the bit length change.

After obtaining the identification code ΔB', the microcomputer 3 transmits an answer signal including the identification code ΔB' (step R7), and returns to the determining step R1.

Thus this embodiment achieves advantages similar to those of the first embodiment. In addition, since this embodiment performs double-encipherment of the identification code ΔB included in an answer signal, it enhances security regarding the answer signal from the transmitter-receiver device 2.

Figure 6:
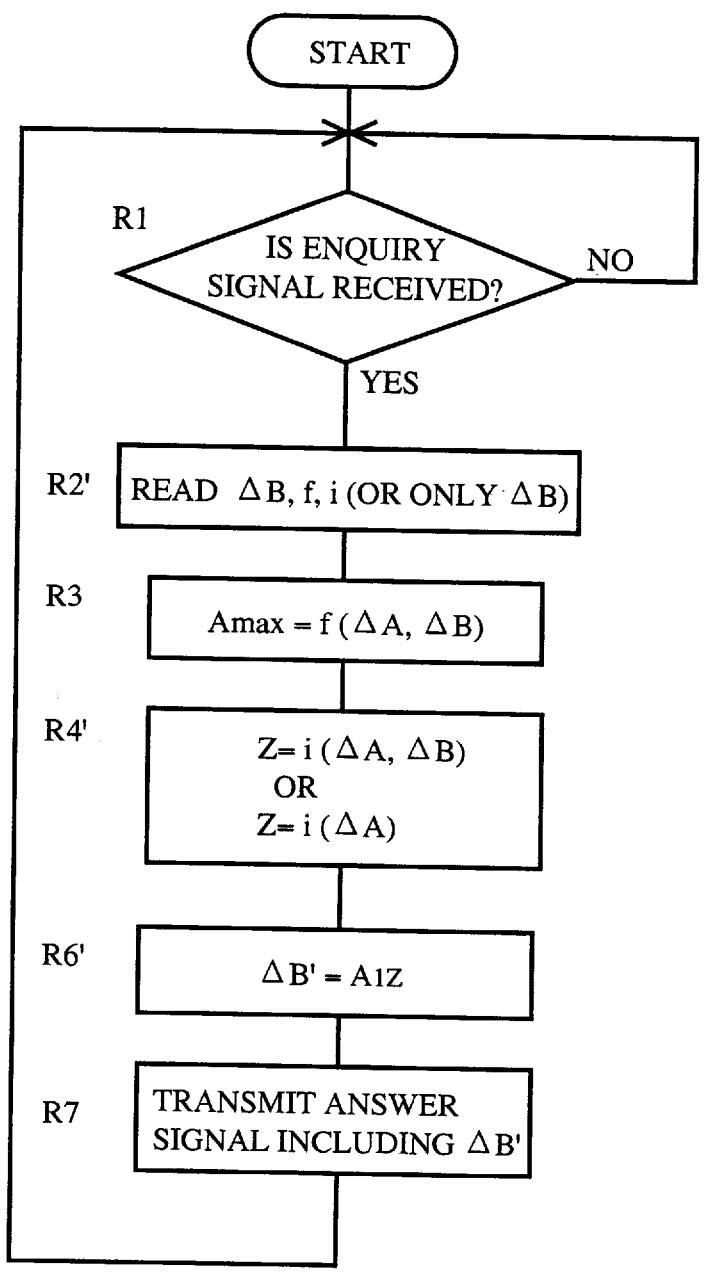
FIG. 6 is a flowchart illustrating the control operation according to a fourth embodiment of the present invention.

FIG. 6 illustrates a fourth embodiment of the invention that achieves advantages similar to those of the third embodiment. The features of the fourth embodiment that distinguishes it from the third embodiment will be described below.

The fourth embodiment differs from the third embodiment in the bit length changing control of the identification code ΔB by the microcomputer 3 of the transmitter-receiver device 2. The flowchart of Fig.6 illustrates the control.

If the microcomputer 3 receives an enquiry signal including the random number data ΔA (affirmative determination in step R1), the microcomputer 3 reads the identification code ΔB and the functions $f_{,13}$ @i from the EEPROM 4 (step R2', and then performs calculations in the following steps R3, R4' and R6' to change the bit length of the identification code ΔB on the basis of the functions f, i and the received random number data ΔA, determining an identification code ΔB'. However, in a construction where the functions f, i are stored in the program ROM, the retrieving of the functions f, i is unnecessary.

The function f is a function for enciphering the identification code ΔB, as in the third embodiment. Step R3 performs the calculation of a function based on both the random number data ΔA and the identification code ΔB as variables, to encipher the identification code ΔB into a cipher code Amax of a predetermined bit length (for example, 40–48 bits) The function i determines the bit length Z of the identification code ΔB' after the bit length change. Step R4' performs function calculation using both the random number data ΔA and the identification code ΔB as variables, or function calculation using only the random number data ΔA as a variable, that is:

$$Z=i(\Delta A, \Delta B)$$

or $$Z=i(\Delta A)$$

Based on the thus-calculated value of the bit length Z, step R6 extracts a code A1Z starting at the first bit (LSB) and ending at the Zth bit of the cipher code Amax, and determines the code A1Z as an identification code ΔB' after the bit length change. Alternatively, the identification code ΔB' may be determined by extracting a code over the MSB and the less significant bits down to the Zth bit in the descending order.

After obtaining the identification code ΔB' the microcomputer 3 transmits an answer signal including the identification code ΔB' (step R7), and returns to the determining step R1.

The present invention is not limited to the disclosed embodiment, but may be expanded or modified by those skilled in the art, including as described below.

Although the embodiments have been described in conjunction with the control of the engine control ECU 23, the invention may be applied to other loads as the control object. The EEPROM 4 need only store at least one of the identification code ΔB and the function. One of the identification code ΔB and the function may be fixed.

Although, according to the third and fourth embodiments, the transmitter-receiver device 2 enciphers the identification code ΔB using the function f and then changes the bit length of the thus-obtained cipher code Amax, it is also possible to change the bit length of the identification code ΔB and then encipher the bit length-changed identification code using the function f.

According to the foregoing embodiments, the transmission-reception ECU 10 performs decoding by calculating an identification code ΔB' by calculation based on the random number data ΔA, identification code ΔB and functions stored in the EEPROM 25 in a calculation manner similar to that of the microcomputer 3 of the transmitter-receiver device 2, and by comparing the thus-determined identification code ΔB' with the identification code ΔB' included in the answer signal from the transmitter-receiver device 2. However, other various decoding operations may be employed. For example, the decoding may be performed by calculating an identification code ΔB from the identification code ΔB' included in the answer signal and then comparing the calculated identification code ΔB with the random number data ΔA stored in the EEPROM 25. In addition, although the above embodiments have been described in conjunction with the transmitter-receiver device 2 having the transponder function of sending back an answer signal in response to a power signal (carrier wave signal) and an enquiry signal, it is possible to employ a transmitter-receiver device provided with a separate power source. It should also be noted that the answer signal enciphering procedure is not limited to the disclosed embodiments.

What is claimed is:

1. A transmitter-receiver device which receives a power signal and an enquiry signal from an outside source, and responds to the enquiry signal by sending back an answer signal including a pre-stored identification code, comprising:

a resonance circuit, capable of receiving electromagnetic signals;

a power circuit for rectifying and smoothing a power signal supplied through the resonance circuit from an external antenna when the external antenna is electromagnetically coupled with the resonance circuit, the power circuit having a first time constant;

a microcomputer powered by output from the power circuit;

a detector circuit, having a second time constant which is lower than the first time constant of the power circuit, and which, when the resonance circuit is electromagnetically coupled with the external antenna, discriminates an enquiry signal supplied together with a power signal through the resonance circuit from the external antenna, and outputs the enquiry signal to the microcomputer;

storing means for storing an identification code; and a modulating circuit that operates to transmit an answer signal by changing an impedance of the resonance circuit, wherein upon receiving the enquiry signal through the detector circuit, the microcomputer generates an altered identification code using the identification code read from the storing means, and controls transmission of the answer signal through the resonance circuit by operating the modulating circuit in a mode corresponding to the altered identification code.

2. A transmitter-receiver device according to claim 1, wherein the storing means comprises a data-reloadable nonvolatile memory so that the identification code can be changed.

3. A transmission-reception system comprising:

an interrogator that transmits an enquiry signal and a power signal; and a responder that receives the power signal to power operation and upon receiving the enquiry signal from the interrogator, responds to the enquiry signal by sending back to the interrogator an answer signal including a pre-stored identification code, the interrogator transmitting random number data together with the enquiry signal, and determining whether the answer signal sent back from the responder matches a predetermined answer by calculation based on random number data and the identification code stored in the interrogator, and the responder changing the bit length of the stored identification code on the basis of the random number data from the interrogator and a predetermined calculation, and sending back an answer signal including the thus-changed identification code.

4. A transmission-reception system according to claim 3, wherein the responder enciphers the stored identification code by a predetermined cryptosystem, changes the bit length of the enciphered identification code on the basis of the random number data from the interrogator and the predetermined calculation, and sends back an answer signal including the thus-changed identification code.

5. A transmission-reception system according to claim 3, wherein the responder changes the bit length of the identification code on the basis of the random number data from the interrogator and the predetermined calculation, enciphers the thus-changed identification code by a predetermined cryptosystem, and sends back an answer signal including the enciphered identification code.

6. A method of authenticating the start-up operation of an apparatus, comprising the steps of:

(a) providing an enquiry signal and a power signal to a start-up key device, the power signal powering operation of the start-up key device;

(b) converting an identification code into an altered identification code, as a function of the enquiry signal in the start-up key device;

(c) transmitting the altered identification code to a start-up control device;

(d) authenticating the start-up key device, by comparing the altered identification information to data in the start-up control device.

7. A method according to claim 6, further comprising the step of:

(f) transmitting a randomly generated number from the start-up control device to the start-up key device, as part of the enquiry signal.

8. A method according to claim 7, further comprising the step of:

(g) translating the identification code to an altered identification code, as a function of the randomly generated number.

9. A method according to claim 8, further comprising the step of:

(h) extracting a set of bits from the identification code stored in the start-up key device, according to the enquiry signal; and (i) transmitting the altered identification code to the start-up control device.

\* \* \* \* \*